June 4, 1957  R. G. PEARSON  2,794,777
ELECTROLYTIC DEIONIZATION
Filed Aug. 27, 1956  2 Sheets-Sheet 1

INVENTOR.
Ralph G. Pearson
BY
Bacon & Thomas
ATTORNEYS

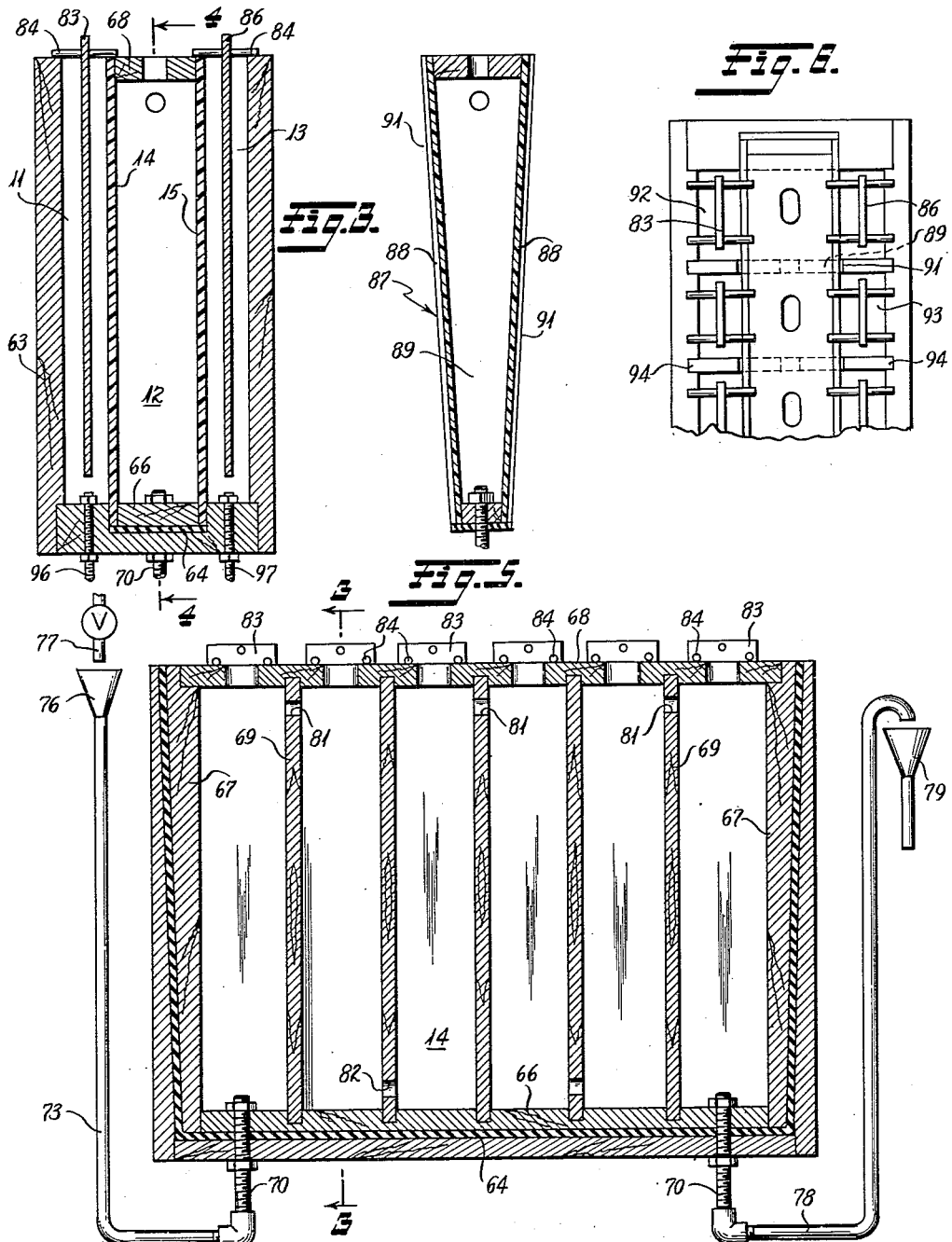

United States Patent Office 2,794,777
Patented June 4, 1957

2,794,777

ELECTROLYTIC DEIONIZATION

Ralph G. Pearson, Evanston, Ill., assignor to Clayton Manufacturing Company, El Monte, Calif., a corporation of California Application August 27, 1956, Serial No. 606,334

8 Claims. (Cl. 204—151)

This invention relates to electrolytic deionization and, more particularly, to a process in which water or other ionizing solvent containing a dissolved electrolyte is treated by a combined electrolytic and ion exchange operation in an electrolytic cell to remove dissolved electrolyte from the solvent.

Ion exchange resins have been employed extensively to remove electrolytes from water. In such processes, the water is passed through one or more beds made up of particles of the ion exchange resins. Such operations have been variously referred to as demineralization, desalting or deionization.

There are a large number of available ion exchange materials including ion exchange resins. In general, the ion exchange resins are the more effective ion exchange materials. Also, in general, the resins in their active forms are composed of condensed or polymerized organic compounds having a large number of replaceable hydrogen or hydroxyl groups dispersed throughout their structure. That is to say, cation exchange resins are usually essentially polymers of condensates of such materials as a phenol and an aldehyde or polymers of vinyl compounds, for example, copolymers of styrene and divinyl benzene. They are polymerized or condensed with acidic material or are treated with acidic materials after formation so as to have within their structure a large number of acid groups such as sulfonic acid or carboxylic acid groups providing replaceable hydrogen atoms. Anion exchange resins are usually formed by the polymerization of an aromatic amine and an aldehyde or by polymerization of a polyamine, a phenol and an aldehyde. Such resins have a large number of replaceable hydroxyl groups dispersed throughout their structure. In general, the extent of polymerization or condensation in both types of resins is carefully controlled so that a limited amount of cross-linking occurs to render the resins insoluble in water or any other polar solvent with which they are to be employed but leaving them capable of absorbing water or other solvent so as to swell therein. The presence of the water or other polar solvent absorbed or imbibed in the resins causes ionization of the resin so that the hydrogen ions in the case of cation exchange resins can be replaced by other cations from solution, for example, sodium, calcium or magnesium ions, and in the case of anion exchange resins the hydroxyl ions can be replaced by other anions from solution, for example, by chloride or sulfate ions.

In conventional deionization of water with ion exchange resins, the water containing electrolytes in solution may be run through a mixed bed of the two resins while the resins are in active form or first through a bed of cation exchange resin and then through a bed of anion exchange resin, or, alternatively, first through a bed of anion exchange resin and then through a bed of cation exchange resin. In any case, the resins become exhausted when their hydrogen or hydroxyl ions are replaced by other ions. The exhausted anion exchange resins must be regenerated with an alkali and the exhausted cation exchange resins must be regenerated with an acid, and in the case of a mixed bed the two resins must be separated prior to regeneration. While the combination of cation and anion exchange resin treatment of water can be employed to remove substantially all ions from water, the processes are expensive, particularly when employed to deionize relatively concentrated solutions, because of the expense of the resin, the extensive equipment required and the costs of regeneration solutions. Such processes are most efficiently employed to deionize very dilute solutions of electrolytes.

Three-compartment electrolytic cells have also been suggested for deionizing or demineralizing water. Such cells consist of an anode compartment at one side of the cell, a middle compartment and a cathode compartment at the other side, the compartments being separated by permeable diaphragms, such as diaphragms of heavy canvas. When a direct current is applied between a cathode in the cathode compartment and an anode in the anode compartment, cations tend to migrate from the middle compartment into the cathode compartment and anions tend to migrate from the middle compartment into the anode compartment. The current carried by substantially all ions moving out of the middle compartment including such ions as sodium, calcium or magnesium cations and sulfate or chloride anions is effective for demineralization. Any anions in the cathode compartment tend to migrate into the middle compartment and the same is true of any cations in the anode compartment. Any current carried by these is ineffective current. Large amounts of hydroxyl anions are produced at the cathode by electrolytic action and, similarly, large amounts of hydrogen cations are produced at the anode. The hydrogen cations thus produced at the anode migrate into the midde compartment, and the hydroxyl anions produced at the cathode migrate into the middle compartment. The hydrogen and hydroxyl ions, particularly the hydrogen ions, are, in general, much more mobile than the other ions present. A large proportion of the current is therefore carried by such hydroxyl anions and hydrogen cations, and as the water in the middle compartment is progressively denuded of other ions, an increasing proportion of the current is carried by hydrogen and hydroxyl ions. This current produces no useful deionizing result except to the extent that the hydroxyl and hydrogen ions combine in the middle compartment to form water. The latter is an exceedingly expensive manner of producing deionized water.

Three-compartment electrolytic cells of conventional types are most efficiently employed to treat relatively concentrated solutions and cannot be economically employed to even approach complete deionization of the water in the central compartment. That is to say, their efficiency drops off rapidly with dilution of the electrolytes in the middle compartment. Furthermore, the diaphragms in conventional electrolytic cells allow considerable seepage of water carrying undesired ions back into the middle compartment, this effect becoming more pronounced as the catholyte and anolyte become more concentrated. At best, conventional electrolytic cells are capable of economically reducing the electrolyte content of relatively concentrated solutions thereof by approximately 50%.

Anion and cation exchange resins can, however, be produced in the form of films or membranes, and by employing sheets of such material as diaphragms in three-compartment electrolytic cells in accordance with the present process, the concentration of electrolytes in the middle compartment thereof can be economically reduced to a very low value. Under the influence of an electric potential, anions will migrate through a diaphragm of anion exchange material by progressive replacement of the replaceable anions already present therein, and in a similar manner cations will migrate through a diaphragm of cation exchange material by progressive replacement of the replaceable cations already present therein. Thus, such anions as sulfate or chloride ions will replace hydroxyl anions originally present in a diaphragm of anion exchange material. After the anion exchange material is exhausted the chloride or sulfate anions from the solution will under the influence of the electric potential continue to replace chloride or sulfate anions at the surface of the diaphragm nearest the cathode and these replaced anions will replace adjacent anions so that anions progressively migrate through the diaphragm toward the cathode and are released at the surface of the diaphragm nearest the anode. In a similar manner, cations will replace cations at the surface of a diaphragm of cation exchange material nearest the anode and cations will migrate through the diaphragm and be released at the surface thereof nearest the cathode.

If the diaphragms are perfect diaphragms, i. e., are sufficiently impermeable that water will not seep therethrough and there are no continuous pores or channels through the diaphragm sufficiently large for ions to migrate directly through the water contained therein, anions cannot pass through a diaphragm of cation exchange material and cations cannot pass through a diaphragm of anion exchange material. That is to say, there is nothing for a cation to replace in an anion exchange material and nothing for an anion to replace in a cation exchange material. Practical diaphragms are, of course, not perfect, but by making the diaphragm nearest the cathode of a film of cation exchange material, the movement of anions including hydroxyl anions produced at the cathode through such diaphragm toward the anode is very much decreased. Similarly, by making the diaphragm nearest the anode of anion exchange material, the movement of cations including hydrogen cations produced at the anode through such diaphragm toward the cathode is also very much decreased. Each of the diaphragms of ion exchange material are thus conductors of electricity predominantly by migration therethrough of ions of one charge only.

The voltage required to cause migration of the corresponding ions through the diaphragm is low, and in a three-compartment electric cell employing diaphragms of ion exchange material, most of the current employed in the cell is effective to remove the desired ions from the middle compartment of the cell. In this connection it is to be noted that, if an acid solution is being deionized, hydrogen cations form part of the ions which it is desired to remove from the solution in the middle compartment of the cell and, similarly, if an alkaline solution is being deionized, hydroxyl anions form part of the ions which it is desired to remove from the solution in the middle compartment. In any portion of an ionized solution of an electrolyte, no matter how large or small, the negative charges of anions present must be balanced by the positive charges of adjacent cations. Thus any removal of an anion from the central compartment through the diaphragm of cation exchange material must be balanced by the removal of a cation or cations of equivalent charge through the diaphragm of cation exchange material and vice versa. Thus, in the specific case of sulfuric acid in the central compartment, the removal of a sulfate anion through the diaphragm adjacent the anode requires the removal of two hydrogen cations through the diaphragm adjacent the cathode. In this case the current carried by the two hydrogen cations is effective deionization current. It is the current carried by cations migrating from the anode compartment to the middle compartment including hydrogen cations produced at the anode and anions migrating from the cathode compartment into the middle compartment including hydroxyl anions produced at the cathode which is ineffective current.

In the cell of the present invention, most of the current is effective current. Such a cell will therefore efficiently reduce the electrolytic content in the water in the middle compartment of the cell to a very low value, the limiting factor being usually the increased movement of ions into the middle compartment through the diaphragms as the concentration of anions in the anolyte and cations in the catholyte builds up relative to their concentrations in the middle compartment, although the resistance of the cell also increases when the ion content of the water in the middle compartment becomes very small.

This limiting factor renders it uneconomical in most cases to substantially completely deionize the water in the middle compartment as power consumption increases rapidly as the electrolyte concentration in the middle compartment becomes very small. Potable water suitable for domestic consumption, or water useful for agricultural purposes or many industrial purposes can, however, be economically produced from waters quite high in electrolytic content. If complete deionization is desired, it is usually preferable to reduce the electrolyte content of the water to a low value by combined electrolytic and ion exchange treatment in a cell as above described and follow this treatment by conventional ion exchange treatment in beds of ion exchange materials as also above described. Both the electrolytic cell and the ion exchange treatments are thereby operated in their most efficient ranges.

It is apparent that a small amount of hydrogen and hydroxyl ions will always exist in the middle compartment of a three-compartment cell in accordance with the present invention, even if the solution therein is neutral, and that a small amount of current will be carried by such ions through the diaphragms of ion exchange materials. As discussed above, current is also carried by anions moving through diaphragms of cation exchange material and by cations moving through diaphragms of anion exchange material. These ineffective currents can, however, be made small in comparison with the current carried by the ions it is desired to remove and very small in comparison with ineffective current carried by hydroxyl and hydrogen ions produced at the cathode and anode, respectively, in conventional three-compartment cells.

It is, therefore, an object of the present invention to provide an improved process of deionizing solutions of electrolytes in which diaphragms of ion exchange materials are employed to largely prevent the undesirable carrying of current by hydroxyl and hydrogen ions.

Another object of the invention is to provide a process of deionizing solutions of electrolytes in which ion exchange resin diaphragms are employed in an electrolytic cell in a manner enabling desired ions to pass through the diaphragms but restricting the passage of undesired ions in reverse directions through such diaphragms.

A further object of the present invention is to provide an improved electrolytic cell having at least three compartments in which a diaphragm of cation exchange material is employed adjacent the cathode and a diaphragm of anion exchange material is employed adjacent the anode.

Another object of the invention is to provide an effective combination of electrolytic and ion exchange treatment for deionizing solutions wherein partial deionization is conducted in an electrolytic cell utilizing ion exchange resin diaphragms for facilitating the operation therein, further deionization is conducted in ion exchange resin beds following the electrolytic cell, and effluent from the electrolytic cell is utilized for regeneration of the resin beds.

Other objects and advantages of the invention will appear in the following detailed description given in conjunction with the attached drawings of which:

Fig. 4 is a vertical cross-section through the cell of Fig. 3 taken on the line 4—4 of Fig. 3;

Fig. 5 is a vertical cross-section through a modified type of middle compartment usable in cells of the types of Figs. 3 and 4;

Fig. 6 is a partial plan view of a cell employing the middle compartment of Fig. 5;

Fig. 7 is a fragmentary cross-section through a modified type of diaphragm employing ion exchange material; and Fig. 8 is a vertical cross-section through a three-compartment electrolytic cell employing a pair of diaphragms of the type illustrated in Fig. 7.

Figure 1:
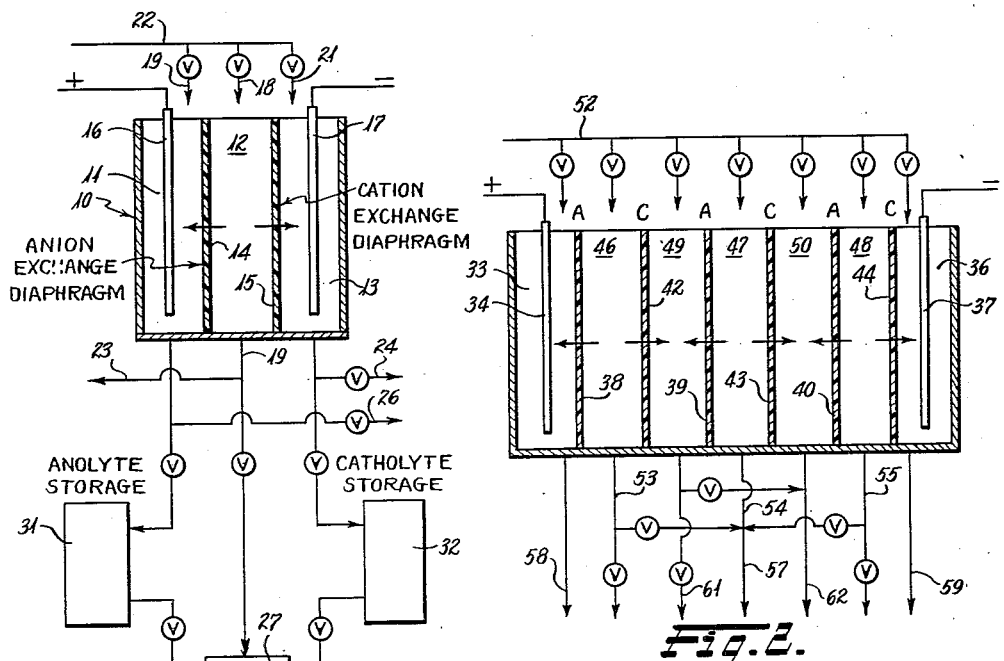
Fig. 1 is a schematic diagram illustrating the employment of a three-compartment electrolytic cell having diaphragms of ion exchange material in conjunction with beds of ion exchange material.

Referring more particularly to the drawings, the cell illustrated diagrammatically in Fig. 1 may include a container 10 of insulating material, the interior of which is divided into three compartments, i. e. an anode compartment 11, a middle compartment 12, and a cathode compartment 13, by means of diaphragms 14 and 15 made of ion exchange material. The diaphragm 14 is made of anion exchange material and the diaphragm 15 is made of cation exchange material. An anode 16 is positioned in the anode compartment 11 such that the diaphragm 14 of anion exchange material is adjacent thereto and a cathode 17 is positioned in the cathode compartment 13 such that the diaphragm 15 of cation exchange material is adjacent thereto. It will be understood that the anode 16 and cathode 17 are connected to a suitable source of low-voltage direct current power so that an electrical potential exists between these electrodes. Although solutions of electrolytes in other ionizing or polar solvents may be treated, the detailed description will be confined to the treatment of aqueous solutions.

A solution of electrolyte to be deionized may be introduced into the middle compartment 12 of the cell through a pipe indicated at 18 and deionized water may be discharged from the middle compartment through a pipe 19. For purposes of discussion, it is convenient to select a particular electrolyte solution, for example, an aqueous solution of sodium sulfate. An aqueous anolyte can be supplied to the anode compartment 11 through a pipe 19 and an aqueous catholyte supplied to the cathode compartment through a pipe 21. The catholyte and anolyte are any conducting solutions and, for example, may be the same as the solution supplied to the central compartment 12 through the pipe 18, i. e. the pipes 18, 19, and 21 may be connected to a common pipe 22, although substantially any source of water can be employed to supply anolyte and catholyte.

Anions, for example, the sulfate ion, will migrate through the anion exchange resin of diaphragm 14 into the anode compartment 11 by progressive replacement of any anions in the anion exchange material of the diaphragm 14. Similarly, cations such as sodium ions will migrate through the cation exchange material of the diaphragm 15 into the cathode compartment 13. Assuming perfect diaphragms, any cations such as sodium ions already in the anode compartment 11 cannot, however, migrate through the anion exchange material of the diaphragm 14 and likewise any anions such as sulfate ions already present in the cathode compartment 13 cannot move through the cation exchange material of the diaphragm 15. Sodium cations already present in the cathode compartment or which have migrated through the diaphragm 15 are discharged at the cathode 17 to form sodium hydroxide, thus producing hydroxyl anions. These hydroxyl anions also cannot migrate back through the diaphragm 15 toward the anode. Sulfate cations are discharged at the anode 16 to form sulfuric acid, thus producing hydrogen cations, but these cations cannot migrate through the diaphragm 14 toward the cathode. In the case of the electrolyte under discussion, the electrolyte content of the water in the middle compartment is reduced; sulfuric acid concentrates in the anode compartment and sodium hydroxide concentrates in the cathode compartment.

Substantially all of the current passing through the cell is utilized in removing sodium cations and sulfate anions from the water in the middle compartment. In general, it is uneconomical to attempt to remove all of the sodium cations and sulfate anions from the water of the middle compartment since with practical diaphragms an appreciable amount of cations will migrate from the anode compartment through the diaphragm of anion exchange material and an appreciable amount of anions will migrate from the cathode compartment through the diaphragm of cation exchange material into the middle compartment, particularly when the ion concentration in the middle compartment becomes low and also the resistance to flow of electric current through the water of this compartment becomes high when its ion content becomes low. However, a water which is relatively low in electrolyte can be economically produced and even waters containing a relatively high concentration of electrolytes such as sea water can be reduced in electrolyte content until they are potable or capable of being employed for irrigation and for many industrial purposes. If it is desired to utilize the water directly from the cell, it may be discharged from the process through a pipe 23.

There is of course a limit to the concentration of alkali which can be reached in the cathode compartment and a limit to the concentration of acid which can be reached in the anode compartment. Catholyte can be intermittently or continuously discharged from the process through pipe 24 and replenished through the pipe 21 to maintain the concentration of the catholyte at the desired value. In a similar manner anolyte can be intermittently or continuously discharged from the process through a pipe 26 and replenished through the pipe 19. Depending upon the concentration of the original water introduced into the cell, the amount of water wasted as acidic and alkaline solutions from the anode and cathode compartments, respectively, will vary but usually ranges between one-tenth and one-third of the water treated in the middle compartment 12.

If a completely deionized water is desired, the remaining electrolyte in the water treated in the middle compartment 12 of the cell 10 can be efficiently removed therefrom by passing the water from the middle compartment of the cell through beds of ion exchange material. The amount of electrolyte to be removed is small and the costs correspondingly small. For example, the water from the middle compartment 12 of the cell may be first passed through a bed of particles of cation exchange material in a cation exchanger 27 and then through a bed of particles of anion exchange material in anion exchanger 28. An acid water will be discharged from the cation exchanger 27 and a substantially neutral water may be discharged from the anion exchanger 28.

It is, of course, apparent that the anion exchanger 28 and cation exchanger 27 can be interchanged so that the water first passes through an anion exchanger and then through a cation exchanger. Furthermore, the cation exchanger 27 and anion exchanger 28 may be combined into a single mixed bed of cation and anion exchange material as is known in the art.

In any case, the cation exchange material must be regenerated after exhaustion. The anolyte from the anode compartment 11 of a cell of the type shown in Fig. 1 may be made sufficiently acid to act as an effective regenerating solution for the cation exchange material in the exchanger 27. For this purpose the electrolytic cell may be operated at a current density and with a flow rate sufficient to produce an anolyte solution having a pH below approximately 2, and of suitable concentration for use as a regenerant. Such concentration may be about 1% or below. Concentrations as low as 0.1% have been found satisfactory. Instead of being discharged as waste, such anolyte may be delivered into an anolyte storage tank 31 and employed for regenerating the cation exchange material. Similarly, the catholyte from the cathode compartment 13 of the cell may be delivered into a catholyte storage tank 32 and employed for regenerating the anion exchange material in the anion exchanger 28. The catholyte likewise should have sufficient alkalinity to provide effective regeneration of the anion exchange material in the exchanger 28. The cell may be operated so as to provide an alkaline catholyte of pH approximately 10 to 12 and of an alkali metal hydroxide concentration of approximately 1%. Concentrations of 1% and even less than 1% have been found satisfactory as regenerating solutions. It will be understood, however, that higher concentrations both of acid and of alkali may be produced in an electrolytic cell of the type described. As is well known in the art, duplicate cation and anion exchangers, or duplicate mixed bed exchangers are usually employed so that one of each type of exchanger can be backwashed, regenerated and rinsed while the other is being used for deionizing water. Although sodium sulfate was selected for purposes of illustration, it is apparent that substantially any other solution of electrolyte or mixtures of electrolyte may be similarly treated. That is to say, substantially all metallic cations will migrate through the cation exchange materials of the diaphragm 15 and substantially all acidic anions will migrate through the diaphragm 14. Thus, nearly any electrolyte or mixture of electrolytes can be removed from water.

Oxygen will, in general, be liberated at the anode, although in the case of halogen anions the element itself will also be liberated. Thus in the case of chlorides, chlorine gas will be liberated at the anode. Hydrogen is, in general, liberated at the cathode. If desired, the cell may be provided with appropriate hoods or covers (not shown) to enable separate collection and recovery of liberated gases.

While water will be the usual solvent for the electrolyte, it is apparent that the electrolytes may be in solution in any polar solvent, for example, alcohol, which has sufficient ionizing power to substantially ionize the dissolved electrolyte. The ion exchange materials employed for the diaphragms should, of course, be selected so as to be insoluble in the solvent but sufficiently permeable to the solvent to cause ionization of the ion exchange material.

Figure 2:
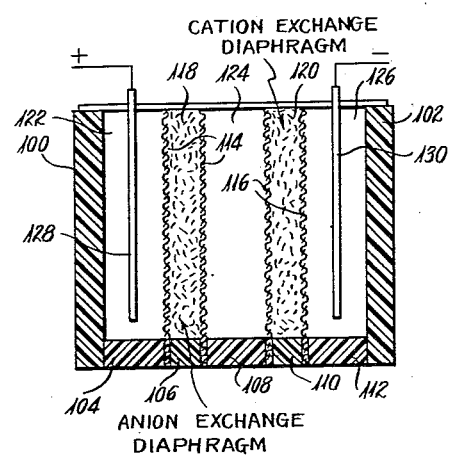
Fig. 2 is a schematic diagram illustrating the employment of a multi-compartment electrolytic cell having diaphragms of ion exchange material.

Fig. 2 shows diagrammatically a cell of the same general type shown in Fig. 1, except that the cell has a plurality of compartments with an anode compartment 33 at one end containing an anode 34 and a cathode compartment 36 at the other end containing a cathode 37. A plurality of diaphragms 38, 39 and 40 of anion exchange material may be positioned in the cell between the anode and cathode and spaced from each other. Similarly, a plurality of diaphragms 42, 43 and 44 of cation exchange material may be positioned in the cell between the anode and cathode and spaced from each other. As shown, diaphragms of anion exchange material are positioned between diaphragms of cation exchange material with a diaphragm 38 of anion exchange material adjacent the anode and a diaphragm of cation exchange material 44 adjacent the cathode. The diaphragms thus provide the cathode compartment 33, a plurality of deionizing compartments 46, 47 and 48, a plurality of concentrating compartments 49 and 50 and the cathode compartment 36.

Upon introducing a solution of electrolyte into all of the compartments through distributor pipe assembly 52, anions will migrate out of deionizing compartments 46, 47 and 48 through the diaphragms of anion exchange material 38, 39 and 40 into the conducting solutions in the compartments 33, 49, and 50, and cations will also migrate out of these compartments through the diaphragms of cation exchange material 42, 43 and 44 into the conducting solutions. The water in these compartments will therefore be denuded of ions of the electrolyte. An alkaline solution will concentrate in the cathode compartment 33. An acid solution will concentrate in the cathode compartment 36 and the electrolyte will also concentrate in the concentration compartments 49 and 50. Deionized water can be withdrawn from compartments 46, 47, and 48 through pipes 53, 54 and 55 and may be separately discharged from the process or combined in a pipe 57. An acid anolyte solution may be withdrawn from the anode compartment through a pipe 58 and an alkaline catholyte solution withdrawn from the cathode compartment through a pipe 59. Solutions of the electrolyte in more concentrated form than originally fed to the cell can be withdrawn from the compartments 49 and 50 through the pipes 61 and 62, respectively. By varying the flow rates through the various compartments, water deionized to different degrees can be withdrawn from the various compartments 46, 47 and 48 and separately discharged, if desired. Similarly, by varying the flow rates through the various compartments, solutions of electrolyte having varying concentrations can be withdrawn from the compartments 49 and 50 and, if desired, separately discharged.

The cell of Fig. 2 can therefore be employed to produce solutions of varying concentration and as many alternate deionizing and concentrating compartments as desired can be employed. It will of course be appreciated that the greater the number of diaphragms and compartments the greater the required voltage across the cell to give a deionizing current, but the power efficiency of such a cell is, in general, greater than the three-compartment cell of Fig. 1. Again, if a substantially completely deionized water is desired, any or all of the waters from the deionizing compartments may be passed through the beds of ion exchange material as explained with reference to Fig. 1, and the anolyte and catholyte employed as regenerating solutions.

Figure 3:
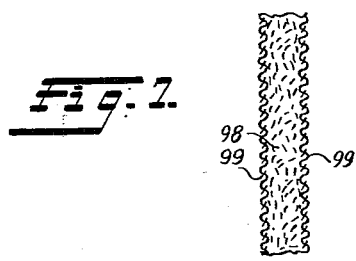
Fig. 3 is a vertical cross-section taken on the line 3—3 of Fig. 4 and illustrates one type of electrolytic cell having diaphragms of ion exchange material.

The cells of Figs. 1 and 2 may take various forms. One form of cell which may be employed is illustrated in Figs. 3 and 4. The container 63 of the cell of these figures may be constructed of non-conducting material, wood being suitable material. A separate middle compartment structure may be inserted within the container 63 and surrounded by a gasket 64 of non-conducting material such as rubber. That is to say, the middle compartment structure may include a bottom member 66, two end members 67 and a top member 68. The end members 67 may be tapered downwardly and inwardly and these end members positioned in registering channels in the ends of the container 63 with the gasket 64 also positioned within the channels, the bottom member 66 of the middle compartment structure being positioned within a channel in the bottom portion of the container also against the gasket 64. The middle compartment structure may also include a plurality of vertically extending partitions 69 fitting into grooves in the top member 68 and in the bottom member 66, the partitions 69 being of the same width as the top and bottom members 66 and 68 and the end members 67. Diaphragms of ion exchange material, which may be the diaphragms 14 and 15 of Fig. 1, may be secured to the top, bottom and end members of the middle compartment structure as well as the partitions 69 in any suitable manner, for example, by an adhesive (not shown).

The middle compartment structure may be held in the container 63 and against the gasket 64, for example, by threaded pipe nipples 70 extending through the bottom member 66 of this structure and through the bottom of the container, suitable nuts on the threaded pipe nipples being employed to hold the middle compartment structure in position and also providing an inlet and an outlet for the middle compartment. It will be noted that the middle compartment structure divides the cell into three compartments which may be the anode compartment 11 of Fig. 2, the middle compartment 12 and the cathode compartment 13. The vertical partitions 69 not only constitute reinforcements for the diaphragms, which may be relatively fragile, but also may be employed to prevent short-circuiting flow of solution through the middle compartment. Thus, water to be deionized may be introduced into one end of the middle compartment through a pipe 73 connected to a pipe nipple 70 and, for a gravity flow cell, this pipe may extend upwardly and terminate in a funnel 76 receiving water from pipe 77. Similarly, the deionized water may be discharged from the other end of the cell through a pipe 78 connected to a pipe nipple 70 and extending upwardly to set the level of liquid in the middle compartment, the pipe 78 discharging into a funnel 79.

Water introduced into the middle compartment of the cell through the pipe 73 can flow upwardly in a first division of the middle compartment defined by a vertical partition 69 and an end member 67 and then through an aperture 81 into the next division. It may flow downwardly through such next division and through another aperture 82, etc. The water thus traverses the various divisions until discharged through the pipe 78. A plurality of separate anodes 83 suitably supported in the anode compartment by dowels 84 extending therethrough may be employed, although in the type of cell disclosed a single continuous anode may be employed. Also, a single cathode or a plurality of separate cathodes 86 also supported by dowels 84 may be positioned in the cathode compartment.

The anodes may be of any suitable material which is resistant to attack by acids, sheets of carbon or graphite being entirely suitable, although certain corrosion-resistant metals such as stainless steel also are satisfactory. Such anodes may be either solid sheets or may be perforated or may be of screen wire construction. The cathodes may be of any suitable material which is not attacked by alkalies, iron being satisfactory, although again stainless steel can be employed for the cathode. Again the cathodes may be either of solid plate construction or be perforated or be of woven wire construction.

Fig. 5 illustrates a modified type of middle compartment structure 87 which may have its sides 88 also tapered. This is to say, the vertical extending members 89 may taper downwardly and rubber gaskets 91 may be adhesively secured to the outer portion of the diaphragm in alignment with the vertically extending members 89 as shown in Fig. 6. The anode and cathode compartments 92 and 93, respectively, may have vertically extending partitions 94 positioned therein in alignment with the vertically extending partitions 89 of the central compartment, the partitions 94 in the anode and cathode compartments being engaged by the gaskets 91. The anode and cathode compartments are thereby provided with divisions which may be connected by apertures (not shown) in the same manner as the middle compartment of Fig. 4 so that short-circuiting of liquids through these compartments is also prevented. The cell of Fig. 6 may be provided with the same type of anodes 83 and cathodes 86 shown in Fig. 3 and otherwise the structure of the cells may be similar to the cell of Figs. 3 and 4.

Liquid may be introduced and withdrawn from the anode and cathode compartments of either the cell of Figs. 3 and 4 or that of Fig. 6 in the same manner that liquid is introduced and withdrawn from the middle compartment of the cell of Figs. 3 and 4. That is to say, pipe nipples 96 and 97 may be employed in the bottom of the anode and cathode compartments, respectively, in the same manner shown in Fig. 3. It will be apparent that multiple-compartment cells such as indicated in Fig. 2 may be constructed by employing a plurality of middle compartment structures such as shown in Figs. 3 to 6 inclusive in a single container.

It will also be apparent that in the cell of Figs. 5 and 6, each division of the middle compartment between the vertical extending partitions 89 along with the corresponding divisions of the anode and cathode compartment, in fact, constitutes a separate cell, and separate electric connection can be made to the anode and cathode of each of these separate cells so as to enable the voltage across each section to be individually adjusted in order to maintain a desired deionizing current in each of the divisions.

If the water being deionized contains an appreciate amount of polyvalent metal ions such as calcium or magnesium, along with alkali metal ions, the pH in the cathode compartment will ordinarily become sufficiently high to precipitate calcium and magnesium compounds insoluble in the alkaline catholyte. In this case, the various sections of the cathode compartment should be provided with clean-out ports (not shown) in their lower portions.

In many cases, it is more economical to first soften the water to be treated in the three- or multiple-compartment cells of the present invention to first remove polyvalent metal ions, for example, by treatment in the cathode compartment of a two-compartment cell having a diaphragm of heavy canvas as disclosed in the patents to Briggs Nos. 2,341,356, granted February 8, 1944, and 2,546,254, granted March 27, 1951. The cells of the Briggs patents economically and efficiently soften water, and the employment of a two-compartment cell prior to the three-compartment cells of the present invention eliminates precipitation difficulties in the cathode compartment of the demineralizing cells of the present invention. In this connection, the removal of most of the polyvalent metal ions by a softening treatment prior to deionization in cells of the present invention is also advantageous since such ions, in general, migrate with less rapidity through cation exchange materials than do alkali metal cations, and the cells of the present invention operate much more rapidly and efficiently if ions of polyvalent metals are first removed from the water being treated.

As stated above, diaphragms of anion and cation exchange resins can be produced from ion exchange resins by polymerizing such resins in the form of films or sheets, for example, films ranging from .010 to .050 inch in thickness, thus providing efficient diaphragms for purposes of the present invention. Thicker diaphragms of such resins, for example, up to ⅛ inch in thickness, may also be employed for increased mechanical strength and increased resistance to migration therethrough of undesired ions. Diaphragms made of such resins may also be backed with a layer of fabric or other material which is readily permeated by water for increased mechanical strength, and in case the resin sheet or film will not withstand drying without damage thereto, the cell should be constructed so that all of the exposed diaphragm is completely immersed in the water.

Diaphragm structures of ion exchange material may also be produced as illustrated in Fig. 7 by packing finely divided ion exchange material 98 between porous walls 99, for example, walls of heavy fabric. The fabric may be canvas or fabrics made of any of several synthetic fibers which are resistant to alkalies and acids and which are readily wetted by water. The ion exchange material packed between the porous walls should be as finely divided and as tightly packed as practicable in order to restrict as far as possible the migration of water through the diaphragms and the presence of water-filled channels through which undesired ions can migrate. For example, any pores of large size or channels through cation exchange material will allow anions to migrate through such channels in addition to the migration of cations through the resin itself. Finely divided ion exchange material of various types may also be compressed under pressure into thin adherent sheets so as to form suitable diaphragms for employment in the present invention. Also, various natural or synthetic fibers may be treated to have ion exchange properties either before or after being woven into fabrics, as is known in the art. Such fibers in very tightly woven fabrics or in tightly compressed layers may also be employed as ion exchange diaphragms in the present invention, although such diaphragms are not, in general, as effective as diaphragms made of ion exchange resins.

In Fig. 8 there is illustrated a three-compartment electrolytic cell of the filterpress type utilizing packed ion exchange resin diaphragms of the type shown in Fig. 7. End walls 100 and 102 are spaced apart by means of a plurality of hollow frames 104, 106, 108, 110, and 112. A pair of canvas or Dynel cloth supporting walls 114 is clamped between frame members 104, 106, and 108 and a similar pair of canvas or Dynel cloth supporting walls 116 is clamped between frame members 108, 110, and 112. Anion exchange material 118 in the form of finely divided particles is packed between the walls 114, and cation exchange material 120 in the form of finely divided particles is packed between the partitions 116. The cell is thereby divided into an anode compartment 122, middle compartment 124, and cathode compartment 126. An anode 128 of insoluble material is supported in the anode compartment 122 and a cathode 130 is supported in the cathode compartment 126. It will be understood that suitable connections (not shown) of the type illustrated in the preceding figures will be provided for introducing and withdrawing solutions from the various compartments.

The cation exchange material employed both in the cation exchange diaphragms in the electrolytic cell and in the cation exchange beds following the electrolytic cell, may be of any suitable type capable of being operated on the hydrogen cycle. Thus, the cation exchange material may be such materials as sulfonated coal derivatives or sulfonated synthetic resins. The sulfonated synthetic resins may be either phenol sulfonic acid derivatives or nuclear sulfonated aromatic hydrocarbon polymers. Certain of the carboxylic acid type of synthetic resin materials may also be employed. The various types of cation exchange materials are well known to the art, and need not be further described. Commercial examples of satisfactory cation exchange resins are, for example, "Amberlite" IR-112 and IR-120 described by the manufacturer as cation exchange resins of the nuclear sulfonic type.

Likewise, the anion exchange materials utilized in the anion exchange diaphragms as well as in the subsequent anion exchange beds may be of any of the types well known to the art. For example, the anion exchange materials may be organic amine derivatives of synthetic resins in which the amines employed may be polyethylene polyamines, guanidines, or metaphenol diamine synthetic resin derivatives of polyethylene polyamine or derivatives containing quaternary nitrogen groups. Commercial examples of satisfactory anion exchange resins are "Amberlite" IRA-400 and IRA-410, said by the manufacturer to be strongly basic amine type anion exchange resins covered by U. S. Patent 2,591,573.

The invention will further be illustrated by the following example of practice:

*Example*

A three-compartment electrolytic cell of the type illustrated in Fig. 8 was set up. The cell was of the filterpress type with the end walls and spacer frames made of Lucite. The electrodes were of platinum. The volumes of the anode, middle, and cathode compartments were all equal, each being of 65 ml. capacity. The volumes of both resin compartments between the respective pairs of supporting walls were equal, both being 32 ml. Dynel cloth was used to form the supporting walls separating the respective compartments. Cation exchange resin, Amberlite IR-120, of 20 to 50 mesh particle size which had been converted to hydrogen form was utilized between the pair of Dynel supporting walls separating the cathode compartment from the middle compartment. Anion exchange resin, Amberlite IRA-400, of 20 to 50 mesh which had been converted to hydroxyl form was utilized between the other pair of Dynel supporting walls separating the middle compartment from the anode compartment. The moist resins were troweled into their respective compartments with slight tamping to prevent air pockets. Water containing 1500 p. p. m. $Na_2SO_4$ was utilized to fill the compartments of the cell, a direct electric current was applied between the electrodes, and sodium sulfate solution of 1500 p. p. m. $Na_2SO_4$ was partially demineralized in the middle compartment of the cell to provide an effluent containing 620 p. p. m. $Na_2SO_4$. The electrolytically partially demineralized water from the cell was then put through a bed of cation exchange resin IR-120 in hydrogen form contained in a glass tube 1 cm. in diameter and 12 cm. long, filled to within ½" of the top. The effluent from this bed was then passed through a similar bed containing anion exchange resin IRA-400 in hydroxyl form. Analysis of the finished water passing through the two ion exchange beds was 140 p. p. m. $Na_2SO_4$. An acid anolyte solution was electrolytically produced in the anode compartment of the electrolytic cell during the partial demineralization of the sodium sulfate solution in the middle compartment. This acid solution had a concentration of 1.02% sulfuric acid as determined by titration with standard NaOH. At the same time, sodium hydroxide solution of 0.89% concentration was produced in the cathode compartment of the electrolytic cell. The sulfuric acid solution and sodium hydroxide solution were used to regenerate respectively the cation and anion exchange resin beds that had been exhausted by the passage of the electrolytically partially demineralized water through them. The regeneration of the cation exchange resin was 40.1% and the anion exchange resin was 20.1%. The rate of addition of the regenerating solutions to the exhausted resins was approximately 2 ml. per five minutes.

This application is a continuation-in-part of my co-pending application Serial Number 286,137, filed on May 5, 1952, now abandoned.

I claim:

1. In an electrolytic process for deionizing water containing dissolved electrolytes in an electrolytic cell having a treating compartment bounded on one side by a diaphragm of anion exchange material and on the other side by a diaphragm of cation exchange material, the steps comprising: flowing the solution to be deionized through the said treating compartment in contact with one side of each of said diaphragms, maintaining conducting solutions in contact with the opposite sides of said diaphragms, passing a direct electric current from one conducting solution through said diaphragms and solution to be deionized to the second conducting solution to partially deionize said solution and provide an acid concentration of not more than about 1% in the conducting solution in contact with the diaphragm of anion exchange material and an alkali concentration of not more than about 1% in the conducting solution in contact with the diaphragm of cation exchange material, flowing said partially deionized solution from said treating compartment in contact with particles of anion exchange material and cation exchange material, and employing at least one of said conducting solutions to regenerate at least the particles of one of said anion and cation exchange materials.

2. In an electrolytic process for deionizing water containing dissolved electrolytes in an electrolytic cell having a treating compartment bounded on one side by a diaphragm of anion exchange material and on the other side by a diaphragm of cation exchange material, the steps comprising: flowing the solution to be deionized through the said treating compartment in contact with one side of each of said diaphragms, maintaining conducting solutions in contact with the opposite sides of said diaphragms, passing a direct electric current from one conducting solution through said diaphragms and solution to be deionized to the second conducting solution to partially deionize said solution and provide an acid concentration of not more than about 1% in the conducting solution in contact with the diaphragm of anion exchange material, flowing said partially deionized solution from said treating compartment in contact with particles of anion exchange material and cation exchange material, and employing said acid conducting solution to regenerate the particles of said cation exchange material.

3. In an electrolytic process for deionizing water containing dissolved electrolytes in an electrolytic cell having a treating compartment bounded on one side by a diaphragm of anion exchange material and on the other side by a diaphragm of cation exchange material, the steps comprising: flowing the solution to be deionized through the said treating compartment in contact with one side of each of said diaphragms, maintaining conducting solutions in contact with the opposite sides of said diaphragms, passing a direct electric current from one conducting solution through said diaphragms and solution to be deionized to the second conducting solution to partially deionize said solution and provide an alkali concentration of not more than about 1% in the conducting solution in contact with the diaphragm of cation exchange material, flowing said partially deionized solution from said treating compartment in contact with particles of anion exchange material and cation exchange material, and employing said alkali conducting solution to regenerate the particles of said anion exchange material.

4. The process of demineralizing water comprising: flowing said water between a diaphragm of anion exchange material and a diaphragm of cation exchange material in contact with said diaphragms, maintaining a first conducting solution in contact with said diaphragm of anion exchange material and separated from said water by said diaphragm of anion exchange material, maintaining a second conducting solution in contact with said diaphragm of cation exchange material and separated from said water by said diaphragm of cation exchange material, passing a direct electric current from said first conducting solution through said diaphragms and through said water to said second conducting solution to partially demineralize said water and to provide an acid concentration of not more than about 1% in said first conducting solution and an alkali concentration of not more than about 1% in said second conducting solution, flowing said water from between said diaphragms into contact with particles of active cation and anion exchange material and employing at least one of said conducting solutions to regenerate at least the particles of one of said anion and cation exchange materials.

5. The process of demineralizing water, comprising: flowing said water through a diaphragm of anion exchange material and a diaphragm of cation exchange material in contact with such diaphragms, maintaining a first conducting solution in contact with said diaphragm of anion exchange material and separated from said water by said diaphragm of anion exchange material, maintaining a second conducting solution in contact with said diaphragm of cation exchange material and separated from said water by said diaphragm of cation exchange material, passing a direct electric current from said first conducting solution through said diaphragms and through said water to said second conducting solution to partially demineralize said water and to provide an acid concentration of not more than about 1% in said first conducting solution and an alkali concentration of not more than about 1% in said second conducting solution, flowing said water from between said diaphragms into contact with particles of active anion and cation exchange material, and employing said conducting solutions to regenerate the particles of said ion exchange materials.

6. In an electrolytic process for demineralizing water in an electrolytic cell having a plurality of compartments separated from one another by alternate diaphragms of cation and anion exchange material, the steps comprising: flowing water to be demineralized through a first compartment bounded on one side by a diaphragm of anion exchange material and on the other side by a diaphragm of cation exchange material, maintaining conducting solutions in the other compartments of said cell, passing a direct electric current from one outermost compartment through said diaphragms and said water to be demineralized to the other outermost compartment to partially demineralize said water and provide an acid concentration of not greater than about 1% in one of said outermost compartments and an alkali concentration of not more than about 1% in the other of said outermost compartments, flowing said partially demineralized water from said first compartment into contact with particles of anion and cation exchange materials and utilizing the acid solution from said one outermost compartment of said cell to regenerate said cation exchange material and the alakaline solution from said other outermost compartment of said cell to regenerate the said anion exchange material.

7. The process of demineralizing water, comprising: flowing said water between a diaphragm comprising particles of finely-divided anion exchange material packed between walls of porous fabric and a diaphragm comprising particles of finely-divided cation exchange material packed between walls of porous fabric, maintaining a first conducting solution in contact with said diaphragm of anion exchange material and separated from said water by said diaphragm of anion exchange material, maintaining a second conducting solution in contact with said diaphragm of cation exchange material and separated from said water by said diaphragm of cation exchange material, passing a direct electric current from said first conducting solution through said diaphragms and through said water to said second conducting solution to partially demineralize said water and to provide an acid concentration of not more than about 1% in said first conducting solution and an alkali concentration of not more than about 1% in said second conducting solution, flowing said water from between said diaphragms into contact with particles of active anion and cation exchange material, and employing the acid solution to regenerate the particles of said cation exchange material and the alkali solution to regenerate the particles of said anion exchange material.

8. An electrolytic cell comprising, a casing for said cell and a plurality of diaphragms of ion exchange material separating said cell into a plurality of adjacent compartments including an anode compartment at one side of said cell and a cathode compartment at the other side of said cell, an anode positioned in said anode compartment, a cathode in said cathode compartment, said diaphragms comprising particles of finely-divided ion exchange material packed between walls of porous fabric, the diaphragm adjacent said anode and separating said anode compartment from an adjacent compartment being of anion exchange material and the diaphragm adjacent said cathode and separating said cathode compartment from an adjacent compartment being of cation exchange material, each compartment of said cell except said anode and cathode compartment having a diaphragm of anion exchange material at one side separating it from an adjacent compartment and a diaphragm of cation exchange material at its other side separating it from an adjacent compartment.

References Cited in the file of this patent

UNITED STATES PATENTS

| | | |
|---|---|---|
| 2,502,614 | Zender | Apr. 4, 1950 |
| 2,636,851 | Juda et al. | Apr. 28, 1953 |
| 2,636,852 | Juda et al. | Apr. 28, 1953 |
| 2,688,572 | Warshaw | Sept. 7, 1954 |
| 2,689,826 | Kollsman | Sept. 21, 1954 |
| 2,763,607 | Staverman | Sept. 18, 1956 |

FOREIGN PATENTS

| | | |
|---|---|---|
| 993,345 | France | July 25, 1951 |

OTHER REFERENCES

"Nature," vol. 165, Apr. 8, 1950, p. 568.

"Helvitica Chimica Acta," vol. 23 (1940), pp. 795–800, Meyer et al.

"Journal of the Electro-Chemical Society," July 1950, pp. 139C–151C, Sollner.